United States Patent [19]

Szalay et al.

[11] 4,169,635
[45] Oct. 2, 1979

[54] FIFTH WHEEL BEARING PLATE COVER

[75] Inventors: Frank Szalay; Joseph C. Kubik, both of Youngstown, Ohio

[73] Assignee: Eastern Tool & Machine, Inc., Youngstown, Ohio

[21] Appl. No.: 878,898

[22] Filed: Feb. 17, 1978

[51] Int. Cl.² .............................................. F16C 17/04
[52] U.S. Cl. .................................... 308/136; 280/433; 308/DIG. 8
[58] Field of Search ................ 280/433; 308/136, 137, 308/DIG. 8, DIG. 5, DIG. 9

[56] References Cited

U.S. PATENT DOCUMENTS

| 3,337,277 | 8/1967 | Arnold | 308/136 |
| 3,704,924 | 12/1972 | Lowry | 308/136 |
| 3,924,909 | 12/1975 | Kent et al. | 308/136 |

*Primary Examiner*—Douglas C. Butler
*Attorney, Agent, or Firm*—Webster B. Harpman

[57] ABSTRACT

A bearing plate cover for the fifth wheel of a vehicle engaging the entire bearing and non-bearing surfaces thereof. The bearing plate cover is composed of a flat sheet plastic material having a low friction coefficient and high deflection characteristics so as to provide a wear resistant slippery surface for contact with another bearing surface.

9 Claims, 5 Drawing Figures

U.S. Patent  Oct. 2, 1979  4,169,635

FIFTH WHEEL BEARING PLATE COVER

BACKGROUND OF THE INVENTION (1.) Field of the Invention

The present invention relates to coupling devices known as fifth wheels on vehicles wherein the trailer of a tractor trailer vehicle is secured on the bearing surface of the fifth wheel which has a cover plate of a plastic low friction material secured thereto over the entire area of the fifth wheel.

(2.) Description of the Prior Art

Prior structures of this type have utilized bearing plate cover attachments for the reduction of friction on a portion or portions of the fifth wheel bearing plate. See for example U.S. Pat. Nos. 3,924,909, 3,704,924 and 3,337,277.

In U.S. Pat. No. 3,924,909, a sandwich effect is disclosed wherein a metal plate is the bearing surface having a plastic plate between it and the fifth wheel.

The present invention has but a single plastic plate cover secured directly to the fifth wheel of the tractor.

U.S. Pat. No. 3,704,924 discloses a slippery plastic cover over most of the wear area of the bearing plate having a metal forward and rearward edge portion.

The present invention is one continuous sheet of plastic material covering the entire upper portion of the fifth wheel.

In U.S. Pat. No. 3,337,277 a self-lubicating veneer of Teflon is provided for the trailer bearing plate. It does not suggest or show a fifth wheel bearing plate cover as disclosed in the present invention.

SUMMARY OF THE INVENTION

A fifth wheel bearing plate cover comprising a sheet of plastic material having a low friction coefficient being secured to the entire surface of the fifth wheel bearing plate so as to provide a low friction plate between the fifth wheel assembly and the engaging trailer plate.

DESCRIPTION OF THE PREFERRED EMBODIMENT

Figure 1:
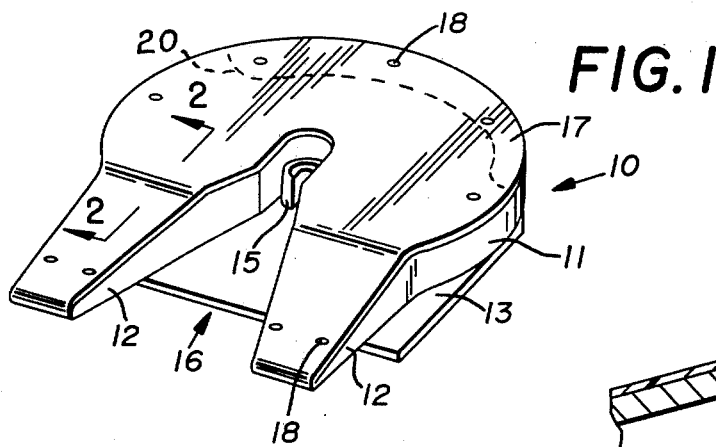
FIG. 1 is a perspective view showing the bearing plate cover attached to the fifth wheel assembly.

Referring to the drawings as seen in FIG. 1, there is illustrated a fifth wheel 10 having a conventional semi-circular configuration with a substantially flat bearing plate 11, with a pair of spaced parallel guides 12 extending outwardly and downwardly from the surface plane of the bearing plate 11. A mounting plate 13 is attached to the bearing plate 11 and positioned therebelow for mounting the same to the tractor 14. The bearing plate 11 and guides 12 are preferably integral.

A draft connection 15 is mounted centrally of the mounting plate 13. A substantially V-shaped passage 16 is formed in the bearing plate 11 the guides 12 allowing access to the draft connection 15.

Figure 2:
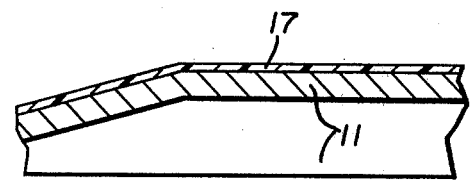
FIG. 2 is a section on line 2—2 of FIG. 1.

As seen in FIGS. 1 and 2 of the drawings, the present invention provides a bearing plate cover 17 made of a sheet plastic material with a low friction coefficient and a high deflection characteristic such as a polyethylene or the like.

Figure 4:
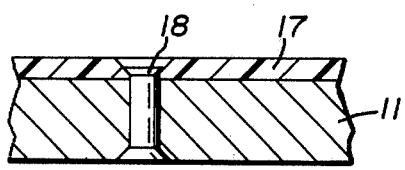
FIG. 4 is a vertical section showing attachment of the bearing plate cover to the bearing plate surface.
Figure 5:
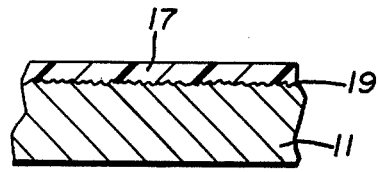
FIG. 5 is a vertical section showing an alternate form of attachment of the bearing plate cover to the bearing plate surface.
Figure 3:
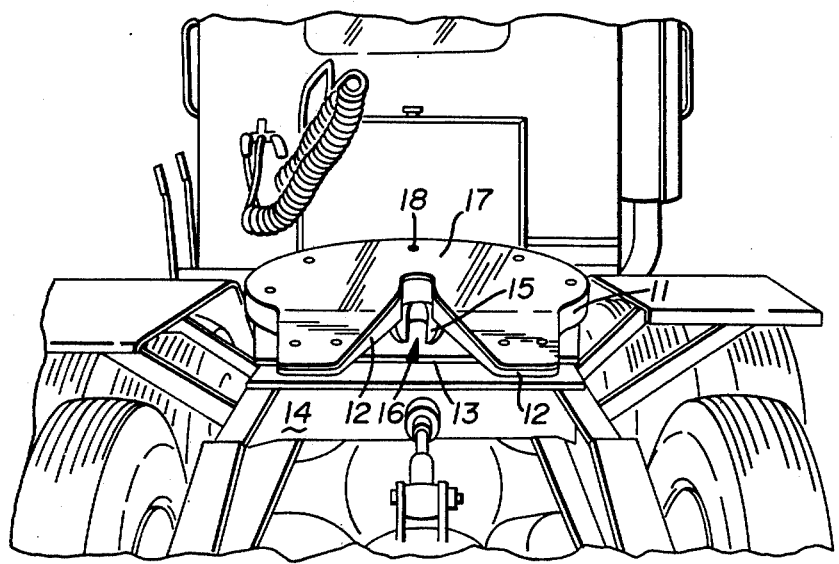
FIG. 3 is a front plan view of the bearing plate cover and related fifth wheel assembly in position on a tractor trailer vehicle.

As seen in FIGS. 2 and 3 of the drawings, a bearing plate cover 17 is shaped to conform to the entire integral surfaces of the bearing plate 11 and guides 12 and is secured thereto by a plurality of fasteners 18. Such fasteners may be counter sunk rivets 18 as seen in FIG. 4 of the drawings, or alternately of an adhesive 19 as shown in FIG. 5 of the drawings. The bearing plate cover 17 thickness is not critical and may range from one-eight to five-sixteenth of an inch in width, one-quarter inch being well suited for this purpose.

As seen in FIG. 1 of the drawings, an arcuate sheet metal member 20 is attached as by the rivets 18 and/or an adhesive to the underside of the bearing plate cover 17 on the peripheral edge and extending inwardly approximately five inches to add additional rigidity to the bearing plate cover 17 and prevent possible buckling at this point.

As seen in FIG. 3 of the drawings, the bearing plate 11 once fitted with the bearing plate cover 17 forms a protective slippery bearing surface for contact with its counterpart plate on the trailer, not shown. The plastic material used in the bearing plate cover 17 is commercially known as an ultra-high molecular weight polyethylene E 400, manufactured by Scranton Plastics Laminating Company of Scranton, Pennsylvania. Such is the nature of this low friction coefficient, high deflection, long wearing plastic that no maintenance is required on the bearing plate cover 17 once it has been installed thereby providing a self-lubricating wear resistant surface for the fifth wheel. Tests of this material have shown that it will support five hundred pounds per square inch without deflection. Tests in actual use on the fifth wheel of a tractor trailer rig driven more than 30,000 miles with the usual coupling and uncoupling actions shows no wear or damage to the bearing plate cover 17 as disclosed herein.

Although but one embodiment of the present invention has been illustrated and described, it will be apparent to those skilled in the art that various changes and modifications may be made therein without departing from the spirit of the invention and having thus described my invention, what we claim is:

1. In combination with a fifth wheel of a vehicle having a substantially flat semi-circular bearing plate with a pair of spaced parallel outwardly extending sloping guides on one side thereof forming a substantially V-shaped passage between the guides extending into the flat bearing plate; a bearing plate cover comprising a section of sheet plastic material having a low friction coefficient and formed in a shape conforming to and covering all of the bearing plate and the sloping guides, a metal member attached coextensively to the underside of said bearing plate cover along one edge thereof for adding rigidity thereto, said metal member extending inwardly from the edge of said bearing plate cover and means for securing the bearing plate cover and said metal member to the bearing plate and guides.

2. The combination of claim 1 and wherein the sheet plastic material is polyethylene having a low friction coefficient and high deflection characteristics.

3. The combination of claim 1 and wherein the means for adding rigidity to the bearing plate cover is an arcuately shaped piece of sheet metal.

4. The combination of claim 3 and wherein said sheet metal member is attached to said bearing plate cover by an adhesive.

5. The combination of claim 3 and wherein said metal sheet member is attached to said bearing plate cover by rivets.

6. The combination of claim 1 and wherein the means for securing the bearing plate cover and said metal member comprises a plurality of counter sunk rivets.

7. The combination of claim 1 and wherein the means for securing the bearing plate cover and said metal member is an adhesive.

8. The combination of claim 1 and wherein the sheet plastic material is an ultra high molecular weight polyethylene.

9. The combination of claim 1 and wherein the sheet plastic material has a thickness of substantially one-quarter inch.

* * * * *